J. M. W. KITCHEN.
MEANS FOR ACCUMULATING, CONCENTRATING, STORING, AND USING WASTE HEAT.
APPLICATION FILED JUNE 24, 1909.
992,881. Patented May 23, 1911.
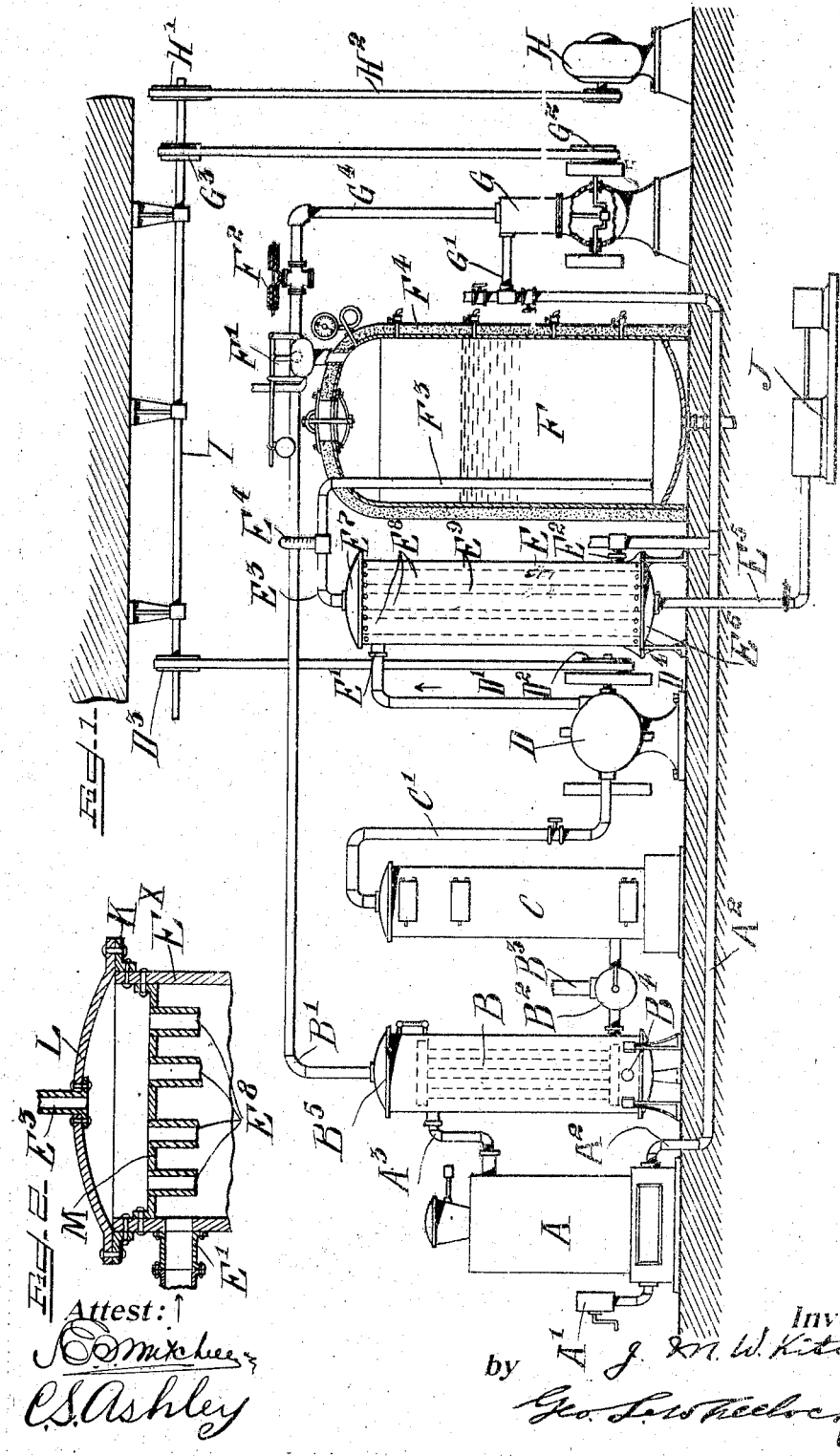

UNITED STATES PATENT OFFICE.

JOSEPH MOSES WARD KITCHEN, OF EAST ORANGE, NEW JERSEY.

MEANS FOR ACCUMULATING, CONCENTRATING, STORING, AND USING WASTE HEAT.

992,881.     Specification of Letters Patent.     Patented May 23, 1911.

Application filed June 24, 1909. Serial No. 504,132.

*To all whom it may concern:*

Be it known that I, JOSEPH MOSES WARD KITCHEN, a citizen of the United States, residing at the city of East Orange, county of Essex, State of New Jersey, have invented new and useful Improvements in Means for Accumulating, Concentrating, Storing, and Using Waste Heat.

The object of this invention is to economize waste heat that may have been generated in an industry or process, by capturing that heat, and accumulating it in small space and in such form that the heat recovered may be utilized at will in motive work or heating, and at such times as the heat may be needed for application in work; as for example, in meeting the demands of unusual loads requiring extra outputs of motive power in generating the electric current, such as occur during the rush hours of travel in connection with traction work, or in those hours in which the largest amount of motive energy is required in generating current for electric lighting.

The invention is particularly of value in economizing the waste heat and surplus kinetic energy of the internal combustion engine and in utilizing the heat wastes of illuminating gas manufacture.

In the production of steam or gas motive power, it is desirable as an economizing procedure to utilize the activity of the power generating means all of the time, while the calls for motive power may vary greatly at different times. In electric generating plants it is usual to keep boilers in reserve with banked fires to meet the requirements of unusual loads, which results in a large outlay of fuel during standby periods. One method for accomplishing such economization is to generate electric energy continually and store it in accumulating batteries to be used intermittently; but this result is only gained at a very large initial cost for installing the batteries, as well as at a very large continual expense for fuel. The idea is old of using the steam boiler during light load hours to keep and store water to flash into steam for motive purposes during peak load hours; but this performance has not been done economically. The use of stored superheated water for propelling cars is old; but my method of heating the water, storing the water in stationary tanks, and then distributing the stored energy through electrical transmission is new, and inaugurates a new era in the conservation of heat energy in certain lines, and makes an economizing procedure practical that was not formerly practical. My method is also a utilitarian advance. My method for accomplishing this economizing result is simple and inexpensive, and when used co-actively in connection with the composite generation of power through the combined use of the internal combustion engine and a steam motor actuated by steam generated from the heat wastes of the internal combustion engine, the economy of fuel secured by this method of generating and storing power is of importance.

In the ordinary generation of motive power by the use of the internal combustion engine using so-called producer or other low cost gas poor in thermic units, and which gas is generated in an internally fired gas generator, there are certain defects and limitations that my method of heat economizing partly or entirely overcomes. In the making of gas of this nature, in order that a gas of usable quality be generated, the combustion in the generator must be maintained at a certain definite and uniform rate. Furthermore, to keep up motive activity in the internal combustion engine, a certain almost uniform rate of speed must be maintained. If the rate of combustion in the generator is too much increased or too much diminished the gas becomes unusable because of inferiority of quality. If the speed of the engine varies outside of certain rates the engine stops. Hence, under certain conditions of small loads for the engine there is waste either of gas that must be bypassed into the atmosphere, or else be converted into superfluous kinetic energy in the engine, which results in fuel wastes in either case. In my co-pending application, Serial No. 460,267, filed Oct. 30, 1908, I show and claim methods of economizing surplus amounts of kinetic energy developed in the gas engine to heat water through exhausting the hot cylinder gases of the gas engine through a heat interchanging water heater under more or less pressure, either by restricting the size of the gas outlet of the heat interchanger, or else by controlling that outlet by a regulatable valve. In this simple way and in connection with the present invention, any desired amount of the kinetic energy of the engine can be transferred to water and stored and utilized at will at any time through the use of the stored energy and of the steam engine. This possibility acquires increased value by generating the electric current through the agency of the stored heat, and by the electrical transmission of the heat energy thus saved.

The prominent novel ideas of the present invention are evolutionary outgrowths of several previous inventions for which patents have been issued to me, or which have been applied for, reference to which is appended to this specification.

The basic idea of this invention is to heat water highly under a heavy steam pressure to a degree at which the temperature of the water is very considerably above that of the temperature of water heated under ordinary steam working pressures; to store the highly heated water; to reduce the high pressure of the steam disengaged from the superheated water through a suitable pressure reducing valve; and then to utilize the steam of reduced pressure in motive work, or in heating, or both.

An important feature of the invention is the distribution of the stored energy through electrical transmission. The water is usually most conveniently given its super-heat by utilizing the principle of the vertical counter current travel of the water and the heating gases bearing the waste heat in a specially designed water heater, and then transferring the heated water to a stationary storage tank, which is well protected from loss of heat in the stored water by a nonconductive covering or casement. The degree of super-heat given to the water would depend on the intensity of the heat in the waste gases and also on the amount of working pressure to be used in applying the steam to motive work.

The question as to the exact temperature to which it is best to heat the water has not been yet determined by the applicant. The question of volume of water, intensity of heat and cost of the storage tanks, are questions which can only be finally decided by somewhat lengthy, expensive and extensive experimentation. If sufficiently superheated, a considerable amount of the superheated water may be disengaged into steam of a working pressure. At lower temperatures residual water in larger amounts, that has lost a large part of its superheat would be withdrawn from the storage tank for re-heating. The residual water withdrawn, and in connection with other water would be pumped through the heater for its high re-heating.

As shown in some of the applications hereafter referred to, water of condensation, which has had more or less of its heat conveyed to air for combustion, could be used for feeding the heater. The exhaust gases emerging from the lower part of the heater would have their heat also conveyed to air by radiating the heat, and the air thus heated by radiation would be used for combustion or for other purposes.

In every case the strength of the structures used for heating and storing the water must be sufficient to easily withstand the amount of pressure of the superheated water.

The inventive ideas involved may be carried out in practice by using one boiler of suitable design in which the highly heated water can be stored, while other amounts of cooler water is gradually heated in the same boiler; but usually it is better to have a separate water heater of a moderate size used in connection with one or more large sized storage tanks, so that the most highly heated water shall not by convection transfer its heat to the water of cooler temperature while it is being heated.

The invention will be made more clear by an inspection of the drawings, in which:

Figure 1 represents diagrammatically, a system for the generation of motive power and the electric current. Fig. 2 represents a detail of the water heater used in the invention.

A represents a producer gas generator.

$A^1$ represents a hand blower for starting the production of gas.

$A^2$ represents a conduit for the introduction of waste gaseous products of combustion or steam underneath the grate of the producer A.

$A^3$ is an outlet pipe for the gas.

B represents a gas cooler and steam generator which cools the gas and under some conditions generates some steam under pressure, which would find outlet through the steam main $B^1$. Feed water is forced upwardly through the device B through the inlet $B^4$. The pressure in the upper part of the steam dome $B^5$ is maintained at the working pressure at which the steam engine G is operated. In case no steam is formed in the heater B, the water heated in it is used as feed water in the water heater E. The newly formed gases pass downwardly through the device B through the two-way valve $B^2$, and either pass upwardly through the purge pipe $B^3$, or are conveyed through the scrubber C and gas pipe $C^1$ to the internal combustion engine D. The exhaust gases from the engine D pass through the exhaust pipe $D^1$ into the water heater E, through the gas inlet $E^1$ and downward through the gas spaces $E^0$. The water heater E has a lower water chamber $E^6$, an upper water chamber $E^7$ and water tubes $E^8$. The heating surfaces of the heater are all submerged.

The water heater E is preferably constructed in the manner shown in detail in Fig. 2. The shell $E^x$ is riveted to the steel annular flange K, and the bung-head L is bolted to the annular flange. A recessed tube head flange M is riveted inside of the shell. There is no steam space in the heater. This form of structure is of great strength, and resists injury from corrosive action of the gases passing through it. Feed water that might be water that has been pre-heated by being passed through the water jacket of the internal combustion engine D, or which might be residual water from the tank F after expending most of its heat in disengaged steam, would be forced under high pressure by the pump J through the feed inlet pipe $E^6$, up through the heating tubes $E^3$, and out through the exit pipes $E^3$. The gases would pass downwardly surrounding the tubes $E^8$ and out through the exit $E^2$, which is sufficiently constricted in size to maintain a back pressure of the gases exhausted into the heater E, the water being progressively heated by the gases which travel downwardly, to such degree as may be desired. The amount of super-heat given to the water is determined by the rate at which the water is forced through the heater E.

$E^4$ represents a thermometer for indicating the temperature given to the water.

F represents a storage tank for the hot water which is forced into it from the water heater E through the supply pipe $F^3$. The tank is well protected from loss of heat by a heavy coating of non-conducting material $F^4$. As a number of such storage tanks would be used, a masonry non-conducting set of cells could be provided into each of which a storage tank could be placed. The pressure created and maintained in the tank F by the force pump J and in the steam disengaged in the heater E, is limited by the action of the relief valve $F^1$, in connection with a pressure reducing valve $F^2$. The water in the tank F having been sufficiently heated, some of it becomes flashed into steam of working pressures through the action of the controlling valve or valves, which steam is used for working the steam motor of the system represented by G, the steam being conveyed to the motor by the conduit $G^1$. The exhaust steam from the engine G leaving through the exhaust pipe $G^1$, would be utilized either singly, or in connection with the gaseous products of combustion, in the gas producing process in the gas producer A; or it would be used for heating purposes or for heating air for combustion. The power generated in the internal combustion engine D and the steam motor G is unified through the action of the shaft I, the pulleys $D^2$, $D^3$, $G^2$ and $G^3$. Favorable rates of rotation in the two motors is conserved by differentiation of the sizes of the pulleys used, which are connected in the usual manner by belting. The total of power generated is conveyed through the pulley $H^1$ and the connecting belt $H^2$ to the electric generator H, from whence the electric current would be delivered for distribution to the places in which the current would be applied in work.

To describe the action of the system, it should be seen that the gas emerging from the producer A has the larger part of its sensible heat absorbed in the cooler B, sometimes generating some steam under pressure. The water that is forced upwardly through the cooler may be a part of the jacket water from the engine of the system, though I usually prefer to radiate the heat of the jacket water, and use the water primarily heated in the device B as feed water for the heater E. The exhaust gases from the engine D, which are not allowed to expand in the heater E, super-heat the water forced through E, and this water is collected in the large storage tank F, thus acting as a means for the concentration and storage of waste heat generated in the system. It will thus be seen that practically all of the waste heat of gases from one or more internal combustion engines, or the heat which escapes from ordinary boilers, or that which escapes after passing over the gas plant retorts can be run through a heater of this character and the water progressively heated, super-heated and stored, and that the heat thus conserved can be applied usefully at any convenient time and at any reasonable distance from the point of generation through electrical transmission. It is obvious that the waste heat from a plurality of internal combustion engines or from various sources of waste heat can thus be concentrated and stored. It is also obvious that not only the residual water in the tank F after its partial cooling can be reheated and restored, but that also low degrees of heat in the gas that has passed through the heater E can be radiated and transferred to air for combustion, a method for doing which performance is claimed in my copending application Serial No. 415,983, filed Feb. 14, 1908.

By slight modification and in connection with my previous inventions, water for heating purposes or for domestic use can be taken from the storage tank and forced by the pressure in the tank and distributed, as well as steam be distributed. As a certain amount of water, after its high heat has been lost in the disengaged steam would be left in the tank, the residual water would have to be withdrawn from it, either at one time, or continuously for re-heating, or for other purposes, such as low pressure motor work in connection with the working of the motor with a condensing exhaust.

Subject matter is herewith disclosed that is not herein claimed, but which is claimed more or less in each one of the following named co-pending applications: Serial No. 415,983, filed Feb. 14, 1908; Serial No. 453,275, filed Sept. 16, 1908; Serial No. 460,267, filed Oct. 30, 1908; Serial No. 465,966, filed Dec. 4th, 1908; Serial No. 504,778, filed June 28, 1909.

What I claim as new is:

1. The combination of (1) means for generating hot gases, said gases carrying exhaust waste heat, (2) means comprising a water heater for transferring to water from said hot gases the heat of the gases that otherwise would be waste heat and for raising the temperature of the water to a temperature above the temperature of water heated sufficiently for forming steam of ordinary working pressures, said water being heated under a higher pressure than the working pressure used, (3) a stationary tank for accumulating and storing the highly heated water, and (4) means for generating motive force from steam disengaged from the highly heated water and further means for generating an electric current from the disengaged steam.

2. The combination of (1) means for generating heated gas, (2) a vertical counter-current arranged heater for super-heating water with the heated gas, (3) a storage and accumulating tank for storing the super-heated water, (4) means for maintaining a high pressure in said heater and said storage tank, (5) a reduction valve for reducing high pressure steam in said tank to a working pressure steam for use in a steam motor, and (6) said steam motor.

3. The combination of (1) a producer gas apparatus for producing gas, (2) an internal combustion engine for burning the gas and producing motive power from said burning, (3) means for super-heating water with the waste heat generated by the internal combustion engine, (4) means for accumulating and storing the super-heated water, (5) means for securing disengagement of steam from the stored heated water, and (6) means for generating motive power from the steam disengaged from said water.

4. The combination of (1) means for generating gas, (2) means for burning the gas and a counter-current heater for the progressive heating of water with heat from the burning of said gas, said water being heated in large quantities to a temperature sufficiently high, and under sufficient pressure to accumulate, concentrate and store much heat in said water, (3) means for storing said heated water and for maintaining the heat of said water to a degree above the temperature of steam at an ordinary working pressure, (4) means for regulating the pressure needed to maintain said water in the highly heated state and for disengaging steam from the water, said means comprising a reduction valve for regulating the pressure of the steam disengaged, and (5) means for utilizing in a motor the steam reduced in pressure by passing through said valve.

5. The combination of (1) means for generating gas, (2) an internal combustion engine for burning the gas, (3) a vertical counter-current water heater, entirely filled with water for heating water with the heat wastes generated in said combination, (4) a water storage tank comprising a steam space for storing the heated water, (5) an automatically acting pressure valve for regulating the steam pressure in the tank, (6) a pressure reducing valve for reducing steam of high pressure in said tank, to steam of a lower working pressure, and (7) a steam motor for utilizing the steam of lower pressure.

6. The combination of (1) a gas generator and an internal combustion engine for generating gas and creating motive power from burning the gas, (2) a water heater for super-heating water with the waste heat created in the generation and burning of said gas, and (3) a stationary storage tank for storing heated water, (4) means for generating motive power from the super-heated stored water, through the disengagement of steam from the stored water, and (5) means for generating an electric current from the motive power generated.

7. The combination of (1) a gas generator, (2) a gas engine for burning the gas generated, (3) a vertically disposed water heater and other means for heating and superheating water with waste heat of the gas engine and, for accumulating and storing the heated water, (4) a steam motor for creating motive force from the heat in the stored water, and (5) means for generating and unifying in an electric current the motive force created separately by said gas engine and by said steam motor.

8. The combination of (1) means for gasifying a solid fuel and burning the gas generated, (2) means comprising a water heater for highly heating water with the gaseous products of the gas burned, (3) means for preventing the direct formation of steam from the highly heated water, (4) means separate and apart from the water heater for accumulating and storing the water heated, (5) means for converting the highly heated and stored water into steam of working pressure, (6) a steam motor actuated by the steam formed from the heated and stored water, and (7) means for generating an electric current from the motive force of the steam motor.

9. The combination of (1) means for generating producer gas, (2) an internal combustion engine for burning the gas generated, (3) a vertically disposed economizing boiler for creating steam from the heat wastes of the generation of the gas and of the internal combustion engine, said boiler or heater comprising upper and lower water spaces connected by vertical water tubes, said tubes having gas spaces around said tubes, (4) a gas inlet leading into said spaces at the upper part of said tubes and a gas outlet from the gas spaces at the lower part of said tubes, (5) means for forcing water through said boiler from a low level to a high level and from thence into a stationary storage tank, (6) said stationary storage tank, said storage tank comprising a non-conductive covering for retaining heat in the water in said tank, (7) means for relieving too high pressures in said tank, (8) a water conduit at a high level of said heater connecting said heater and the interior of said tank, and (9) means for drawing steam from said tank and applying said steam in useful work.

10. The combination of (1) means for super-heating water, said water being primarily heated with low degrees of waste heat, (2) means comprising a stationary water tank for storing water thus heated, (3) means for disengaging steam at will from the stored heat of the water, and (4) means for utilizing intermittently and at will in motive work the steam disengaged by reducing the pressure of the steam after it is disengaged from the stored heated water by generating motive power from the disengaged steam and generating the electric current from the motive power generated.

11. The combination of (1) a vertically disposed water heater for heating water on the vertical counter current principle of heating by gases traveling downwardly through said heater and water traveling upwardly through said heater, said water heater comprising a cylindrical side shell $E^x$, annular flanges K attached to said shell, bung heads bolted to said annular flanges, and tube heads M recessed and riveted in said shell, (2) a water storage tank separate and apart from said water heater for storing water heated in the water heater, (3) a water conduit connecting said water heater and said storage tank for conveying water from the heater into the tank, (4) means for generating intensely heated gases for the high heating of the water in said water heater, and (5) means for drawing at will steam from said storage tank and for applying said steam in useful work.

12. The combination of (1) means for generating hot gases, (2) means for heating water with said hot gases by means of a plunging travel of said gases and a vertical upward travel of water to be heated, (3) means for storing water that has been heated by said plunging travel of gases and which has been conveyed to a place beyond the heating surfaces traversed by the water and heating gases, and (4) means for maintaining a high pressure upon the water stored and for maintaining a high degree of super-heat in the water stored, and for the disengagement of steam from the water stored, and for the reduction in pressure of the steam disengaged from the water and for the use in motive work of the steam reduced in pressure.

13. The combination of (1) a stationary water tank for storing highly heated water, (2) means for super-heating water and conveying said water into said tank, (3) means comprising a steam engine for generating motive power from steam disengaged from the highly-heated water in said tank, and (4) means for generating an electric current from motive power generated from steam flashed from the highly heated water in said tank.

14. The combination of (1) a storage tank for super-heated water, (2) a means for super-heating the water, (3) means for transferring the heated water into the tank, (4) means for generating motive power from the stored heat in the tank and (5) means for re-heating the residual water left in said tank after its heat has been decreased to a temperature below that required for generating steam of sufficient pressure for motor work and for re-introducing the reheated water in said tank.

15. The combination of (1) a source of motive power, (2) a source of waste gases of high heating intensity, (3) means comprising a water heater for heating water with the waste gases and a storage tank separate from the water heater for storing the heated water, (4) means separate from the first named element for generating motive power from the stored heated water, and (5) means for uniting in work the two sources of motive power.

16. The combination of (1) a producer gas generator, (2) an internal combustion engine for using the gas generated, (3) a water heater for heating water with the heat wastes of the internal combustion engine and of the gas generator, said second and third named elements comprising means for transferring the heat wastes of the gas production and of the kinetic energy of said engine into super-heated water, (4) a storage tank for storing and accumulating the super-heated water heated by said waste heat, and (5) means for generating motive power from the stored super-heat of the water.

17. The combination of (1) means for generating heating gases of high intensity, (2) a vertical counter-current water heater for heating water with the gases of high intensity, said water heater being entirely filled with water except as to the gas traversing passages, (3) a water storage tank comprising a steam space for the heated water, said tank being connected with said heater, (4) an automatically acting pressure relief valve for said tank, (5) a pressure reduction valve connecting with said tank for reducing super-steam pressure to a working pressure, and (6) a steam motor for utilizing the steam of reduced pressure.

18. The combination of (1) means for highly heating water, (2) a storage tank connected with said means but separate and apart from said means and providing for storing the water after its heating, (3) means for securing a disengagement of the steam from the heated water stored in the tank and for applying the steam in work, and (4) means for re-heating the residual water left in the tank after steam has been disengaged from said water and for the return of the re-heated water to the tank for storage therein.

19. The combination of (1) a stationary hot water storage tank and means for generating heat and super-heating the water in the tank, (2) a counter-current water heater connected with said tank and comprising provision for pre-heating water for said tank with the lower degrees of the heat generated by said means for generating heat and after the highest degrees of heat generated have been used in the super-heating of the water, (3) a steam engine actuated by the steam disengaged from the highly heated water in the tank, and (4) means for re-heating the water that has been stored in the tank.

20. The combination of (1) means for generating highly heated gas, (2) a vertical counter current water heater for highly heating water with the heat of said highly heated gas, (3) a storage tank for receiving and storing the highly heated water, said tank comprising a non-conductive covering to prevent heat losses from said tank, (4) a steam motor, and (5) means for transferring steam of high pressure from said tank, and conveying said steam to said steam motor at a pressure less than the pressure of the steam in said tank, and in quantities suitable for actuating said motor, said last named means being separate and apart from the ordinary throttle valve of the steam motor.

21. The combination of (1) means for highly heating water, (2) means comprising a storage tank separate and apart from said first named means for storing the highly heated water, (3) means for creating kinetic energy from the highly heated stored water, and (4) means for re-heating more or less of the stored water that has lost part of its heat in the creation of kinetic energy, and restoring the reheated water for repeated use.

JOSEPH MOSES WARD KITCHEN.

Witnesses:
GEO. L. WHEELOCK,
ELIZABETH B. KING.